United States Patent
Liu

(10) Patent No.: US 10,355,866 B2
(45) Date of Patent: Jul. 16, 2019

(54) FILE REPUTATION ACQUIRING METHOD, GATEWAY DEVICE, AND FILE REPUTATION SERVER

(71) Applicant: Huawei Technologies Co., Ltd., Shenzhen (CN)

(72) Inventor: Zhenhua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 423 days.

(21) Appl. No.: 15/264,719

(22) Filed: Sep. 14, 2016

(65) Prior Publication Data

US 2017/0005801 A1 Jan. 5, 2017

Related U.S. Application Data

(63) Continuation of application No. PCT/CN2015/073878, filed on Mar. 9, 2015.

(30) Foreign Application Priority Data

Mar. 18, 2014 (CN) .......................... 2014 1 0101467

(51) Int. Cl.
*H04L 9/32* (2006.01)
*G06F 21/56* (2013.01)
(Continued)

(52) U.S. Cl.
CPC .......... *H04L 9/3242* (2013.01); *G06F 16/137* (2019.01); *G06F 21/563* (2013.01);
(Continued)

(58) Field of Classification Search
CPC .................................................. H04L 9/3242
See application file for complete search history.

(56) References Cited

U.S. PATENT DOCUMENTS 7,660,865 B2 * 2/2010 Hulten .................... H04L 51/12
709/206
8,621,625 B1 12/2013 Bogorad et al.
(Continued)

FOREIGN PATENT DOCUMENTS

CN 101576947 A 11/2009
CN 102822839 A 12/2012

OTHER PUBLICATIONS

Foreign Communication From a Counterpart Application, European Application No. 15764199.4, Extended European Search Report dated Nov. 21, 2016, 11 pages.
(Continued)

*Primary Examiner* — Kambiz Zand
*Assistant Examiner* — Thanh H Le
(74) *Attorney, Agent, or Firm* — Conley Rose, P.C.

(57) ABSTRACT

A file reputation acquiring method, a gateway device, and a file reputation server, the method comprising the gateway device acquires at least one function in the accessed file and acquiring a function hash value of each function in the at least one function to obtain at least one function hash value, determines, using a classifier obtained in advance by training, a probability distribution separately corresponding to each function hash value, where the probability distribution is used to indicate a probability that each function hash value appears in a file of a black sample set, and a probability that each function hash value appears in a file of a white sample set, and determines a reputation value of the accessed file according to the probability distribution corresponding to each function hash value.

16 Claims, 4 Drawing Sheets

(51) Int. Cl.
   *G06F 21/62*      (2013.01)
   *H04L 29/06*      (2006.01)
   *G06F 16/13*      (2019.01)

(52) U.S. Cl.
   CPC ...... *G06F 21/6218* (2013.01); *H04L 63/0853* (2013.01); *H04L 63/0876* (2013.01); *G06F 2221/034* (2013.01)

(56) References Cited

U.S. PATENT DOCUMENTS

| | | | |
|---|---|---|---|
| 8,719,939 B2* | 5/2014 | Krasser | G06F 21/56 726/24 |
| 2003/0065926 A1 | 4/2003 | Schultz et al. | |
| 2006/0036693 A1 | 2/2006 | Hulten et al. | |
| 2011/0162070 A1* | 6/2011 | Krasser | G06F 21/564 726/23 |

OTHER PUBLICATIONS

Foreign Communication From a Counterpart Application, PCT Application No. PCT/CN2015/073878, English Translation of International Search Report dated Jun. 15, 2015, 2 pages.

Foreign Communication From a Counterpart Application, PCT Application No. PCT/CN2015/073878, English Translation of Written Opinion dated Jun. 15, 2015, 6 pages.

* cited by examiner

FILE REPUTATION ACQUIRING METHOD, GATEWAY DEVICE, AND FILE REPUTATION SERVER

CROSS-REFERENCE TO RELATED APPLICATIONS

This application is a continuation of international patent application number PCT/CN2015/073878 filed on Mar. 9, 2015, which claims priority to Chinese patent application number 201410101467.5 filed on Mar. 18, 2014, both of which are incorporated by reference.

TECHNICAL FIELD

The present disclosure relates to the field of computer technologies, and in particular, to a file reputation acquiring method, a gateway device, and a file reputation server.

BACKGROUND

With the rapid development of computer technologies, network security is increasing concern to people. Different application program files need to be accessed when a user uses a terminal of the user to perform a network application service such as web browsing, and it is very likely that these files have been attacked by various malicious virus code, causing the terminal of the user to be infected by virus.

In a network such as a wireless local area network (WLAN), a second generation (2G) mobile communications technology network, or a third generation (3G) mobile communications technology network, a user generally accesses the network using a network device such as a gateway device, a gateway general packet radio service (GPRS) support node (GGSN), a base station, or an enhanced base station in order to access a network application. At present, after receiving a request for accessing an application program file from a user, the network device needs to acquire a reputation value of the file, and performs subsequent processing based on the reputation value such as determining whether to allow user access. In an actual application, an enterprise user generally particularly concerns about a reputation value of a file accessed by the user, for example, concerns about whether a reputation value of an e-mail sent by the user or an File Transfer Protocol (FTP) file transmitted by the user satisfies a particular requirement in order to ensure security and reliability of a network system of an enterprise that the user belongs to. At present, a widely used manner for acquiring a file reputation includes that a network device such as a gateway device generates a characteristic value according to all or some content of a file currently accessed by a user, which is subsequently referred to as an "accessed file" for short in this application, and then queries a database, which stores a correspondence between a known characteristic value and a file reputation value, of the gateway device for a reputation value of the accessed file according to the generated characteristic value.

In the foregoing manner, a characteristic value of a file is generated according to content of the file. In a case in which new application services emerge continuously or applications are updated and upgraded frequently, a phenomenon that a file reputation value corresponding to a characteristic value of a queried file does not exist in a file reputation database often occurs, resulting in a query failure.

SUMMARY

Embodiments of the present disclosure provide a file reputation acquiring method, a gateway device, and a file reputation server, which are used to mitigate a problem in the prior art that a failure rate of a query for a file reputation value is high in a manner in which a characteristic value is generated based on file content.

According to a first aspect, an embodiment of the present disclosure provides a file reputation acquiring method, including acquiring at least one function in the accessed file and acquiring a function hash value of each function in the at least one function to obtain at least one function hash value, where the accessed file is an executable program file, determining, using a classifier obtained in advance by training, a probability distribution separately corresponding to each function hash value in the at least one function hash value, where the probability distribution is used to indicate a probability that each function hash value appears in a file of a black sample set, and a probability that each function hash value appears in a file of a white sample set, where the black sample set includes at least one malicious program file, and the white sample set includes at least one normal program file, and determining a reputation value of the accessed file according to the probability distribution corresponding to each function hash value.

According to the first aspect, in a first possible implementation manner of the first aspect, acquiring at least one function in the accessed file and acquiring a function hash value of each function in the at least one function to obtain at least one function hash value includes acquiring information, which is included in a header of the accessed file, about a function start position, disassembling, from the function start position, the accessed file using a ret instruction as a function end instruction, to acquire the at least one function in the accessed file, and separately calculating a function hash value of each function in the at least one function using a preset hash algorithm.

According to the first aspect or the first possible implementation manner of the first aspect, in a second possible implementation manner of the first aspect, determining, using a classifier obtained in advance by training, a probability distribution separately corresponding to each function hash value in the at least one function hash value includes sending the at least one function hash value to a file reputation server such that the file reputation server determines, using the classifier obtained in advance by training, the probability distribution separately corresponding to each function hash value in the at least one function hash value, and correspondingly, before determining a reputation value of the accessed file according to the probability distribution corresponding to each function hash value, the method further includes receiving the probability distribution corresponding to each function hash value and returned by the file reputation server.

According to the first aspect or the first possible implementation manner of the first aspect, in a third possible implementation manner of the first aspect, determining a reputation value of the accessed file according to the probability distribution corresponding to each function hash value includes determining whether a function hash value of a first type, where a probability distribution of the function hash value of the first type indicates that a probability that the function hash value of the first type appears in the file of the black sample set is higher than a first preset threshold, exists in the accessed file, determining whether a quantity of function hash values of the first type exceeds a preset quantity, and determining that the accessed file has a reputation value lower than a second preset threshold if the quantity of function hash values of the first type exceeds a preset quantity.

According to a second aspect, an embodiment of the present disclosure provides a file reputation acquiring method, including separately acquiring at least one function in a file of a black sample set and at least one function in a file of a white sample set, where the black sample set includes at least one malicious program file, and the white sample set includes at least one normal program file, separately calculating a function hash value of each function in the at least one function in the file of the black sample set and the at least one function in the file of the white sample set, training a classifier using the function hash value of each function as an input, and counting, at an output end of the classifier, a quantity of times that the function hash value of each function appears in the file of the black sample set and a quantity of times that the function hash value of each function appears in the file of the white sample set, and for the function hash value of each function, performing normalization processing on the quantity of times that the function hash value appears in the file of the black sample set and the quantity of times that the function hash value appears in the file of the white sample set, to obtain a probability distribution of the function hash value of each function in order to form a function hash value probability distribution set.

According to the second aspect, in a first possible implementation manner of the second aspect, after obtaining a probability distribution of the function hash value of each function in order to form a function hash value probability distribution set, the method further includes receiving at least one function hash value sent by a gateway device, where the at least one function hash value is acquired by the gateway device according to an accessed file, and the accessed file is an executable program file, determining, using the classifier obtained by training, a probability distribution separately corresponding to each function hash value in the at least one function hash value in the accessed file, and sending, to the gateway device, the probability distribution corresponding to each function hash value in the at least one function hash value in the accessed file.

According to the first possible implementation manner of the second aspect, in a second possible implementation manner of the second aspect, determining, using the classifier obtained by training, a probability distribution separately corresponding to each function hash value in the at least one function hash value in the accessed file includes querying the function hash value probability distribution set for the probability distribution separately corresponding to each function hash value in the at least one function hash value in the accessed file.

According to a third aspect, an embodiment of the present disclosure provides a gateway device, including a processor and a memory storing instructions that when executed by the processor cause the processor to acquire at least one function in the accessed file and acquire a function hash value of each function in the at least one function to obtain at least one function hash value, where the accessed file is an executable program file, determine, using a classifier obtained in advance by training, a probability distribution separately corresponding to each function hash value in the at least one function hash value, where the probability distribution is used to indicate a probability that each function hash value appears in a file of a black sample set, and a probability that each function hash value appears in a file of a white sample set, where the black sample set includes at least one malicious program file, and the white sample set includes at least one normal program file, and determine a reputation value of the accessed file according to the probability distribution that is corresponding to each function hash value and that is obtained by the determining module.

According to the third aspect, in a first possible implementation manner of the third aspect, where the instructions when executed by the processor cause the processor to acquire information, which is included in a header of the accessed file, about a function start position, disassemble, from the function start position obtained by the acquiring unit, the accessed file using a ret instruction as a function end instruction, to acquire the at least one function in the accessed file, and separately calculate, using a preset hash algorithm, a function hash value of each function in the at least one function obtained by the assembling unit.

According to the third aspect or the first possible implementation manner of the third aspect, in a second possible implementation manner of the third aspect, where the instructions when executed by the processor cause the processor to send the at least one function hash value to a file reputation server such that the file reputation server determines, using the classifier obtained in advance by training, the probability distribution separately corresponding to each function hash value in the at least one function hash value, and receive the probability distribution corresponding to each function hash value and returned by the file reputation server.

According to the third aspect or the first possible implementation manner of the third aspect, in a third possible implementation manner of the third aspect, where the instructions when executed by the processor cause the processor to determine whether a function hash value of a first type, where a probability distribution of the function hash value of the first type indicates that a probability that the function hash value of the first type appears in the file of the black sample set is higher than a first preset threshold, exists in the accessed file, determine whether a quantity of function hash values of the first type exceeds a preset quantity, and determine that the accessed file has a reputation value lower than a second preset threshold if the quantity of function hash values of the first type exceeds a preset quantity.

According to a fourth aspect, an embodiment of the present disclosure provides a file reputation server, including a processor and a memory storing instructions that when executed by the processor cause the processor to separately acquire at least one function in a file of a black sample set and at least one function in a file of a white sample set, where the black sample set includes at least one malicious program file, and the white sample set includes at least one normal program file, separately calculate a function hash value of each function in the at least one function in the file of the black sample set and the at least one function in the file of the white sample set, train a classifier using the function hash value, which is obtained by the calculation module, of each function as an input, and count, at an output end of the classifier, a quantity of times that the function hash value of each function appears in the file of the black sample set and a quantity of times that the function hash value of each function appears in the file of the white sample set, and for the function hash value of each function, perform normalization processing on the quantity of times that the function hash value appears in the file of the black sample set and the quantity of times that the function hash value appears in the file of the white sample set, to obtain a probability distribution of the function hash value of each function in order to form a function hash value probability distribution set.

According to the fourth aspect, in a first possible implementation manner of the fourth aspect, where the instructions when executed by the processor further cause the processor to receive at least one function hash value sent by a gateway device, where the at least one function hash value is acquired by the gateway device according to an accessed file, and the accessed file is an executable program file, determine, using the classifier obtained by training, a probability distribution separately corresponding to each function hash value in the at least one function hash value in the accessed file, and send, to the gateway device, the probability distribution corresponding to each function hash value in the at least one function hash value in the accessed file.

According to the first possible implementation manner of the fourth aspect, in a second possible implementation manner of the fourth aspect, where the instructions when executed by the processor cause the processor to query the function hash value probability distribution set for the probability distribution separately corresponding to each function hash value in the at least one function hash value in the accessed file.

In the file reputation acquiring method, the gateway device, and the file reputation server that are provided in the embodiments of the present disclosure, after a function hash value of at least one function in an accessed file is acquired, a probability distribution corresponding to each function hash value is determined using a classifier that is obtained in advance by training such that a reputation value of the accessed file is determined according to the probability distribution. A reputation value of a file is evaluated and determined based on a probability distribution of a function hash value in an accessed file. A function is used as a smallest unit, even in a case in which probability distributions of a few function hash values in the accessed file cannot be determined using a classifier that is obtained by training. The reputation value of the accessed file can still be evaluated and determined according to a function hash value of another function in the accessed file, which reduces occurrences of a case in which a reputation value of an accessed file cannot be determined, and compared with a manner, in the prior art, in which a characteristic value is generated based on file content, improves a success rate when a file reputation value is determined.

DESCRIPTION OF EMBODIMENTS

Figure 1:
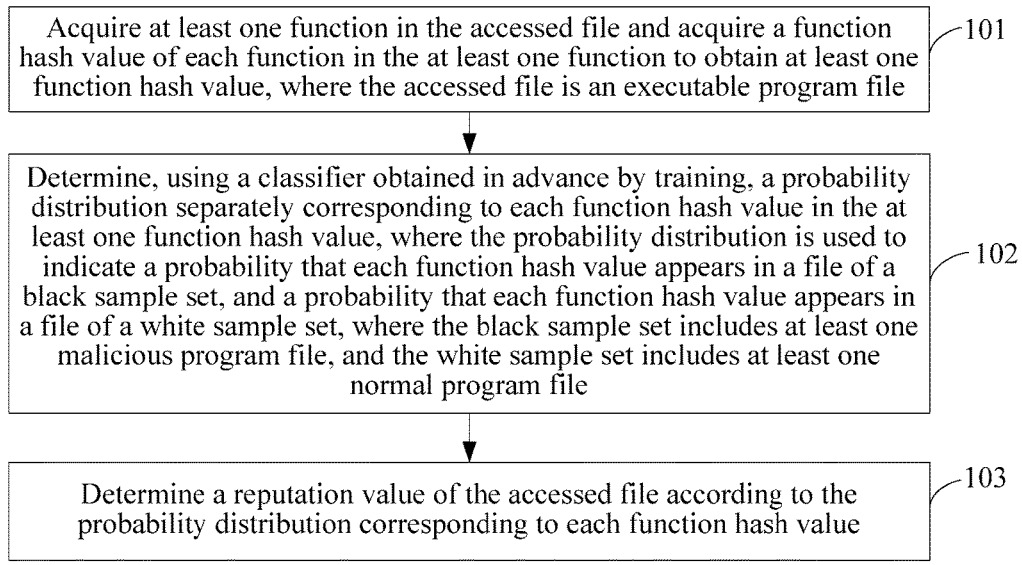
FIG. 1 is a flowchart of a file reputation acquiring method according to Embodiment 1 of the present disclosure.

FIG. 1 is a flowchart of a file reputation acquiring method according to Embodiment 1 of the present disclosure. The file reputation acquiring method provided in this embodiment may be performed by a network device such as a gateway device, a GGSN, or a base station, and description is provided in this embodiment using only a gateway device as an example. As shown in FIG. 1, the file reputation acquiring method provided in this embodiment includes the following steps.

Step 101: Acquire at least one function in the accessed file and acquire a function hash value of each function in the at least one function to obtain at least one function hash value, where the accessed file is an executable program file.

In an actual application, all executable program files that a user needs to access when using some applications include a group of functions. These functions are distributed continuously in the file, each function is a segment of instruction data, and a program running process is a process of executing these function instructions.

In this embodiment, an example in which a user in an enterprise performs an application such as sending and receiving an electronic-mail (e-mail) or transmitting an FTP file using a gateway device is used to describe a method for acquiring a reputation value of an accessed file accessed by the user. The gateway device receives a request for the application service from the user terminal when the user triggers an application service, such as sending and receiving an e-mail, on a user terminal of the user, and therefore obtains a program file that the user needs to access when the user performs the application service, that is, the accessed file described in this embodiment. Because the accessed file is an executable program file and includes at least one function, the gateway device disassembles the accessed file, to delimit the at least one function included in the accessed file, and then obtains a hash value of each function by calculation using a hash algorithm such as a message digest algorithm 5 (MD5) or cyclic redundancy check (CRC). The function hash value, as an attribute of a corresponding function, uniquely identifies the corresponding function.

Further, in this embodiment, the gateway device may acquire the function hash value of the at least one function in the accessed file in the following manner. Acquiring information, which is included in a header of the accessed file, about a function start position, disassembling, from the function start position, the accessed file using a ret instruction as a function end instruction, to acquire the at least one function in the accessed file, and separately calculating a function hash value of each function in the at least one function using a preset hash algorithm.

In addition, currently, a widely used data transmission manner is transmitting data in a form of a data stream. For example, in an application service such as video watching, data is transmitted in a network in a form of a data stream. In this case, an entire application program file is transmitted in the network in a form of data packets.

In the foregoing application scenario, a data packet that includes a file header often includes start position information of a program code section, that is, a function section, and information such as a size of an entire file and a size of each data packet if a file that a user needs to access is a file that is transmitted in a form of a data stream, because the accessed file is carried by data packets and is transmitted in the network. Therefore, the gateway device determines a function start position according to information about the function start position, and disassembles, from the start position, the accessed file using a ret instruction as a function end instruction, to determine each function in the accessed file. The gateway device further separately calculates a function hash value of each function according to a preset hash algorithm, for example, an algorithm such as the MD5 or the CRC. In this process, because the file is transmitted in a unit of a data packet, the gateway device needs to perform the foregoing processing on the data packets one by one until processing of all the data packets have been completed, to obtain function hash values of all functions included in the entire file.

Step 102: Determine, using a classifier obtained in advance by training, a probability distribution separately corresponding to each function hash value in the at least one function hash value, where the probability distribution is used to indicate a probability that each function hash value appears in a file of a black sample set, and a probability that each function hash value appears in a file of a white sample set, where the black sample set includes at least one malicious program file, and the white sample set includes at least one normal program file.

In this embodiment, after obtaining each function hash value in the accessed file, the gateway device may determine, using the classifier obtained in advance by training, the probability distribution separately corresponding to each function hash value. Further, the gateway device may interact with a file reputation server disposed on a network side, to send each function hash value to the file reputation server such that the file reputation server determines, using the classifier obtained in advance by training, the probability distribution separately corresponding to each function hash value in the at least one function hash value, and returns the probability distribution corresponding to each function hash value to the gateway device.

For the probability distribution corresponding to each function hash value in this embodiment, the probability distribution is used to indicate a probability that each function hash value appears in a file of a black sample set, and a probability that each function hash value appears in a file of a white sample set, where the black sample set includes at least one malicious program file, and the white sample set includes at least one normal program file. The malicious program file especially refers to a virus file, and that a function hash value appears in the file of the black sample set refers to that the function hash value exists in a hash value set that is formed by a function hash value of a function included in the malicious program file, and correspondingly, that a function hash value appears in the file of the white sample set refers to that the function hash value exists in a hash value set that is formed by a function hash value of a function included in the normal program file.

It may be understood that, in this embodiment, the gateway device may send each function hash value included in the accessed file to the file reputation server such that the file reputation server queries for and determines, using the classifier that is obtained in advance by training by the file reputation server, the probability distribution separately corresponding to each function hash value, or the gateway device may train in advance a classifier locally, and then determines, using the classifier obtained by local training, the probability distribution separately corresponding to each function hash value. In order to avoid increasing load of the gateway device, a former manner is used preferably, that is, the training and querying processing is performed by the file reputation server.

Therefore, the file reputation server constructs in advance a black sample set and a white sample set to train the classifier in order to obtain a training result of the classifier, that is, a function hash value probability distribution set that includes probability distributions of function hash values included in a malicious program file of the black sample set and probability distributions of function hash values included in a normal program file of the white sample set. The training result of the classifier is used to determine the probability distribution of each function hash value included in the accessed file. In this embodiment, the classifier may be trained using a machine learning method such as Bayes or a support vector machine.

Step 103: Determine a reputation value of the accessed file according to the probability distribution corresponding to each function hash value.

After determining the probability distribution separately corresponding to each function hash value in the accessed file, the gateway device determines the reputation value of the accessed file according to each determined probability distribution. Furthermore, the following manner may be used: determining whether a function hash value, whose probability distribution indicates that a probability that the function hash value appears in the file of the black sample set is higher than a first preset threshold, exists in the accessed file, determining whether a quantity of function hash values, whose probability distributions indicate that probabilities that the function hash values appear in the file of the black sample set are higher than the first preset threshold, exceeds a preset quantity, and determining that the accessed file has a reputation value lower than a second preset threshold if function hash values, whose quantity exceeds the preset quantity and whose probability distributions indicate that probabilities that the function hash values appear in the file of the black sample set are higher than the first preset threshold exist.

In this embodiment, it may be assumed that the malicious program file in the black sample set has a very low reputation value, for example, the reputation value is 0, and the normal program file in the white sample set has a very high reputation value, for example, the reputation value is 1. After the gateway device determines the probability distribution separately corresponding to each function hash value in the accessed file, the gateway device may obtain, by means of statistics, a function distribution status in the accessed file, that is, how many functions that have a relatively high probability of appearing in the file of the black sample set and how many functions that have a relatively high probability of appearing in the file of the white sample set exist in the accessed file. It indicates that the reputation value of the accessed file is relatively low if the accessed file has many functions that have a relatively high probability of appearing in the file of the black sample set, and a relatively low reputation value may be evaluated and given to the accessed file, for example, the reputation value is 0.2.

In this embodiment, after a function hash value of at least one function in an accessed file is acquired, a probability distribution in a one-to-one correspondence with each function hash value is determined using a classifier that is obtained in advance by training such that a reputation value of the accessed file is determined according to the probability distribution. A reputation value of a file is evaluated and determined based on a probability distribution of a function hash value in an accessed file. A function is used as a smallest unit. Even in a case in which probability distributions of a few function hash values in the accessed file cannot be determined using a classifier that is obtained by training. The reputation value of the accessed file can still be evaluated and determined according to a function hash value of another function in the accessed file, which does not cause a case in which a reputation value of an accessed file cannot be determined, therefore effectively resolving a problem in the prior art that a manner in which a characteristic value is generated based on file content causes a failure in a query for a file reputation value. Besides, only a probability distribution of at least one function hash value in the accessed file needs to be queried for and obtained, and then the reputation value of the accessed file is evaluated and determined according to the probability distribution, which helps to reduce excessive dependence on a sample quantity compared with a manner in which a file reputation value is directly queried for and obtained. In addition, a function is used as a smallest unit, which can ensure that sufficient function sample space is obtained, and even for a totally new accessed file, a probability distribution of a function hash value of the file can also be obtained, thereby further ensuring reliability of acquiring a file reputation value.

Figure 2:
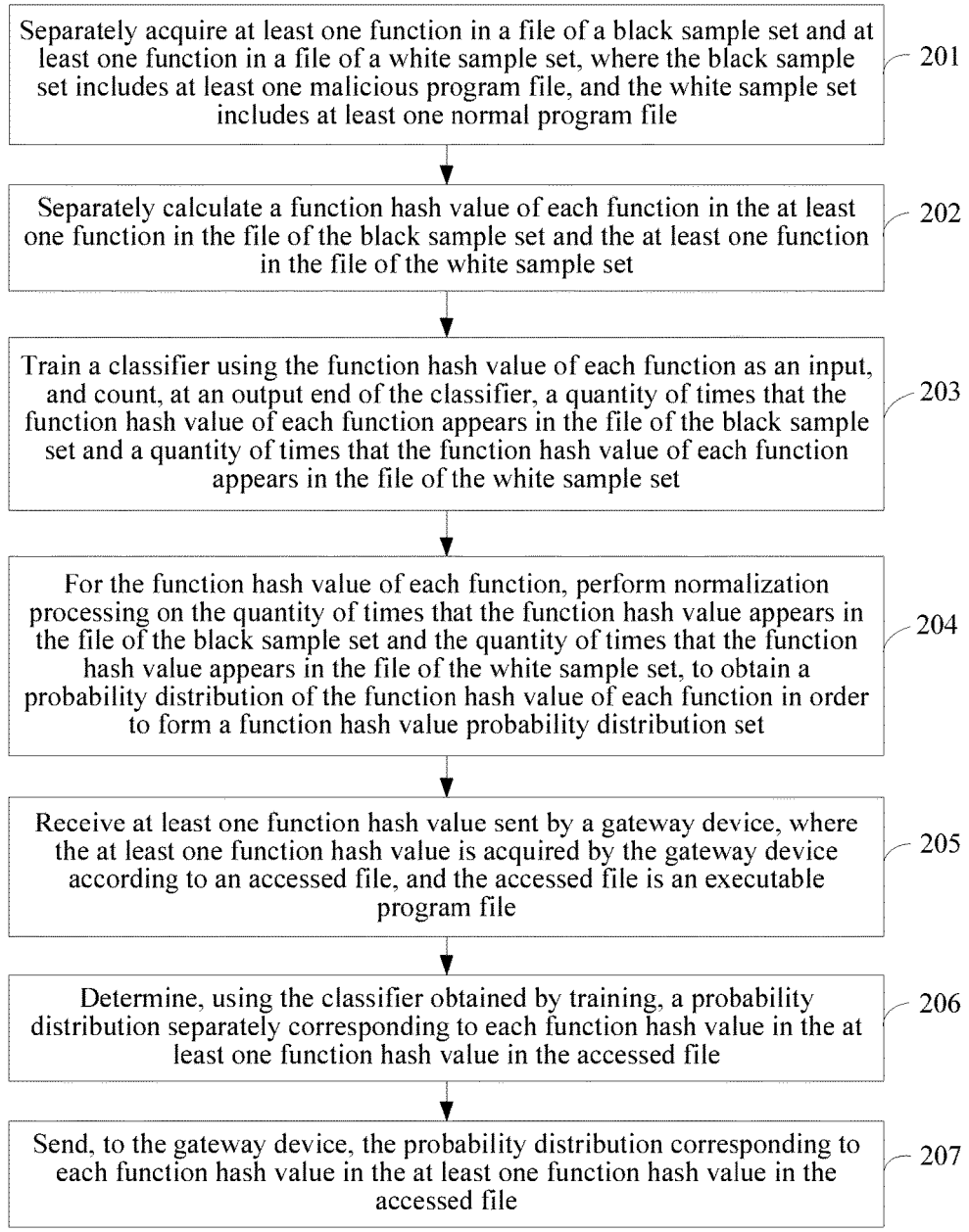
FIG. 2 is a flowchart of a file reputation acquiring method according to Embodiment 2 of the present disclosure.

FIG. 2 is a flowchart of a file reputation acquiring method according to Embodiment 2 of the present disclosure. The method provided in this embodiment may be performed by the gateway device in Embodiment 1, or may be performed by a file reputation server disposed on a network side. In a case in which the method is performed by the gateway device, the gateway device queries for and obtains a required probability distribution of a function hash value according to a local function hash value probability distribution set. In a case in which the method is performed by the file reputation server, the file reputation server may interact with multiple gateway devices, and provide a probability distribution, required by the gateway devices, of a function hash value. In FIG. 2, description is provided using only an example in which the method is performed by a file reputation server disposed on a network side. As shown in FIG. 2, the method includes the following steps.

Step 201: Separately acquire at least one function in a file of a black sample set and at least one function in a file of a white sample set, where the black sample set includes at least one malicious program file, and the white sample set includes at least one normal program file.

Step 202: Separately calculate a function hash value of each function in the at least one function in the file of the black sample set and the at least one function in the file of the white sample set.

Step 203: Train a classifier using the function hash value of each function as an input, and count, at an output end of the classifier, a quantity of times that the function hash value of each function appears in the file of the black sample set and a quantity of times that the function hash value of each function appears in the file of the white sample set.

Step 204: For the function hash value of each function, perform normalization processing on the quantity of times that the function hash value appears in the file of the black sample set and the quantity of times that the function hash value appears in the file of the white sample set, to obtain a probability distribution of the function hash value of each function in order to form a function hash value probability distribution set.

In this embodiment, before determining a reputation value of an accessed file, the file reputation server needs to train the classifier according to the black sample set and the white sample set that are collected in advance, to obtain a training result in order to determine the reputation value of the accessed file according to the training result.

The file reputation server first separately acquires the at least one function in the file of the black sample set and the at least one function in the file of the white sample set, where the black sample set includes the at least one malicious program file, and the white sample set includes the at least one normal program file. The at least one function in the black sample set may be obtained by disassembling each malicious program file of the black sample set, and the at least one function in the white sample set may be obtained by disassembling each normal program file of the white sample set. A manner of obtaining a function from a malicious program file or a normal program file is similar to a manner of obtaining a function from the accessed file in step 101 in Embodiment 1, and details are not described herein again.

Then, the function hash value of each function in the at least one function in the file of the black sample set and the at least one function in the file of the white sample set is separately calculated using a preset hash algorithm. Then, the classifier is trained using the function hash value of each function in the black sample set and the white sample set as an input, and the quantity of times that the function hash value of each function appears in the file of the black sample set and the quantity of times that the function hash value of each function appears in the file of the white sample set are counted at the output end of the classifier. Then, for the function hash value of each function, normalization processing is performed on the quantity of times that the function hash value appears in the file of the black sample set and the quantity of times that the function hash value appears in the file of the white sample set, to obtain the probability distribution of the function hash value of each function in order to form the function hash value probability distribution set. For example, if a function hash value appears in the malicious program file of the black sample set 100 times, but appears in the normal program file of the white sample set 400 times, after normalization processing, a probability that the function hash value appears in the file of the black sample set is 100/(100+400)=20%, and a probability that the function hash value appears in the file of the white sample set is 400/(100+400)=80%, and so on, and the probability distribution of each function hash value included in the file of the black sample set and the file of the white sample set is obtained.

Step 205: Receive at least one function hash value sent by a gateway device, where the at least one function hash value is acquired by the gateway device according to an accessed file, and the accessed file is an executable program file.

Step 206: Determine, using the classifier obtained by training, a probability distribution separately corresponding to each function hash value in the at least one function hash value in the accessed file.

Step 207: Send, to the gateway device, the probability distribution corresponding to each function hash value in the at least one function hash value in the accessed file.

After training the classifier, the file reputation server may query for and determine, using the classifier obtained after training, the probability distribution of each function hash value included in the accessed file. The file reputation server receives the at least one function hash value sent by the gateway device, where the at least one function hash value is acquired by the gateway device according to the accessed file, and the accessed file is an executable program file. Then, the function hash value probability distribution set that is obtained by training the classifier is queried for the probability distribution separately corresponding to each function hash value in the at least one function hash value in the accessed file, and the probability distribution corresponding to each function hash value is sent to the gateway device such that the gateway device determines the reputation value of the accessed file according to the probability distribution.

In this embodiment, a file reputation server trains a classifier in advance according to function hash values that are included in files of black and white sample sets, to obtain a function hash value probability distribution set, to determine a probability distribution of each function hash value by querying the probability distribution set after receiving each function hash value in an accessed file such that a gateway device determines a reputation value of the accessed file according to the probability distribution. In the prior art, a characteristic value of a file is generated based on file content, thus, different files have different characteristic values. In this embodiment, training samples of the classifier are the function hash values of the files in the black sample set and the white sample set. An executable program file includes functions, and different executable program files have many same functions. Therefore, compared with the prior art, dependence on a quantity and real-time quality of sample files can be reduced effectively. Besides, the file reputation server stores the function hash value probability distribution set that includes a correspondence between a function hash value and a probability distribution. Different from a manner in which a file reputation value is directly queried for and obtained in the prior art, in this embodiment, the gateway device needs to evaluate and determine the reputation value of the accessed file according to the probability distribution, received from the file reputation server, of each function hash value in the accessed file, thereby effectively resolving a problem in the prior art that a manner in which a characteristic value is generated based on file content causes a failure in a query for a file reputation value, and ensuring reliability of acquiring a file reputation value.

Figure 3:
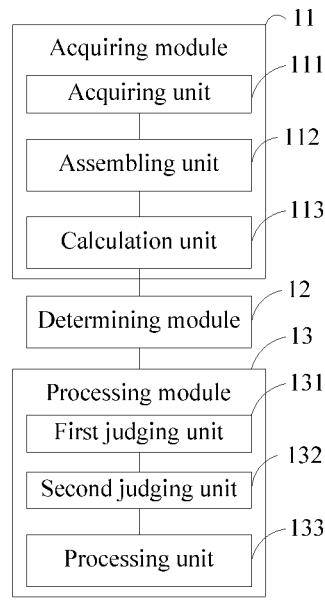
FIG. 3 is a schematic structural diagram of a gateway device according to Embodiment 3 of the present disclosure.

FIG. 3 is a schematic structural diagram of a gateway device according to Embodiment 3 of the present disclosure. As shown in FIG. 3, the gateway device includes an acquiring module 11 configured to acquire at least one function in the accessed file and acquire a function hash value of each function in the at least one function to obtain at least one function hash value, where the accessed file is an executable program file, a determining module 12 configured to determine, using a classifier obtained in advance by training, a probability distribution separately corresponding to each function hash value in the at least one function hash value, where the probability distribution is used to indicate a probability that each function hash value appears in a file of a black sample set, and a probability that each function hash value appears in a file of a white sample set, where the black sample set includes at least one malicious program file, and the white sample set includes at least one normal program file, and a processing module 13 configured to determine a reputation value of the accessed file according to the probability distribution that is corresponding to each function hash value and that is obtained by the determining module 12.

Further, the acquiring module 11 includes an acquiring unit 111 configured to acquire information, which is included in a header of the accessed file, about a function start position, an assembling unit 112 configured to disassemble, from the function start position obtained by the acquiring unit 111, the accessed file using a ret instruction as a function end instruction, to acquire the at least one function in the accessed file, and a calculation unit 113 configured to separately calculate, using a preset hash algorithm, a function hash value of each function in the at least one function obtained by the assembling unit 112.

The determining module 12 is further configured to send the at least one function hash value to a file reputation server such that the file reputation server determines, using the classifier obtained in advance by training, the probability distribution separately corresponding to each function hash value in the at least one function hash value, and receive the probability distribution corresponding to each function hash value and returned by the file reputation server.

Further, the processing module 13 includes a first judging unit 131 configured to determine whether a function hash value, whose probability distribution indicates that a probability that the function hash value appears in the file of the black sample set is higher than a first preset threshold, exists in the accessed file, a second judging unit 132 configured to determine whether a quantity of function hash values, whose probability distributions indicate that probabilities that the function hash values appear in the file of the black sample set are higher than the first preset threshold, exceeds a preset quantity, and a processing unit 133 configured to determine that the accessed file has a reputation value lower than a second preset threshold if function hash values, whose quantity exceeds the preset quantity and whose probability distributions indicate that probabilities that the function hash values appear in the file of the black sample set are higher than the first preset threshold exist.

The gateway device in this embodiment may be used to perform the technical solutions of the method embodiment shown in FIG. 1, and their implementation principles and technical effects are similar, and details are not described herein again.

Figure 4:
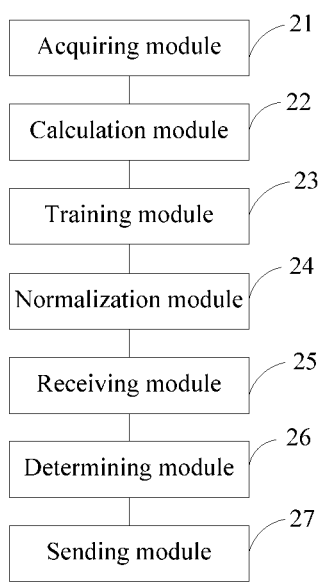
FIG. 4 is a schematic structural diagram of a file reputation server according to Embodiment 4 of the present disclosure.

FIG. 4 is a schematic structural diagram of a file reputation server according to Embodiment 4 of the present disclosure. As shown in FIG. 4, the server includes an acquiring module 21 configured to separately acquire at least one function in a file of a black sample set and at least one function in a file of a white sample set, where the black sample set includes at least one malicious program file, and the white sample set includes at least one normal program file, a calculation module 22 configured to separately calculate a function hash value of each function in the at least one function in the file of the black sample set and the at least one function in the file of the white sample set, a training module 23 configured to train a classifier using the function hash value, which is obtained by the calculation module 22, of each function as an input, and count, at an output end of the classifier, a quantity of times that the function hash value of each function appears in the file of the black sample set and a quantity of times that the function hash value of each function appears in the file of the white sample set, and a normalization module 24 configured to perform normalization processing on the quantity of times that the function hash value appears in the file of the black sample set and the quantity of times that the function hash value appears in the file of the white sample set for the function hash value of each function, to obtain a probability distribution of the function hash value of each function in order to form a function hash value probability distribution set.

The server further includes a receiving module 25 configured to receive at least one function hash value sent by a gateway device, where the at least one function hash value is acquired by the gateway device according to an accessed file, and the accessed file is an executable program file, a determining module 26 configured to determine, using the classifier obtained by training, a probability distribution separately corresponding to each function hash value in the at least one function hash value in the accessed file, and a sending module 27 configured to send, to the gateway device, the probability distribution corresponding to each function hash value in the at least one function hash value in the accessed file.

The determining module 26 is further configured to query the function hash value probability distribution set for the probability distribution separately corresponding to each function hash value in the at least one function hash value in the accessed file.

The file reputation server in this embodiment may be used to perform the technical solutions of the method embodiment shown in FIG. 2, and their implementation principles and technical effects are similar, and details are not described herein again.

Figure 5:
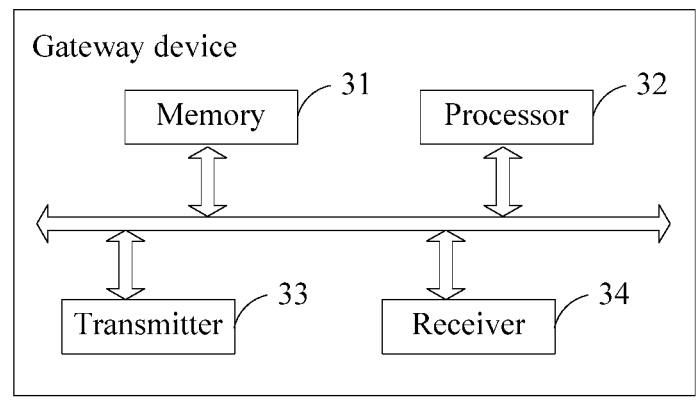
FIG. 5 is a schematic structural diagram of a gateway device according to Embodiment 5 of the present disclosure.

FIG. 5 is a schematic structural diagram of a gateway device entity according to Embodiment 5 of the present disclosure. As shown in FIG. 5, the gateway device entity includes a memory 31 and a processor 32 connected to the memory 31, where the memory 31 is configured to store a set of program code, and the processor 32 is configured to invoke the program code stored in the memory 31 to perform steps in the file reputation acquiring method shown in FIG. 1, which is acquiring a function hash value of at least one function in an accessed file, where the accessed file is an executable program file, determining, using a classifier obtained in advance by training, a probability distribution separately corresponding to each function hash value in the at least one function hash value, where the probability distribution is used to indicate a probability that each function hash value appears in a file of a black sample set, and a probability that each function hash value appears in a file of a white sample set, where the black sample set includes at least one malicious program file, and the white sample set includes at least one normal program file, and determining a reputation value of the accessed file according to the probability distribution corresponding to each function hash value.

Furthermore, the processor 32 is configured to acquire information, which is included in a header of the accessed file, about a function start position, disassemble, from the function start position, the accessed file using a ret instruction as a function end instruction, to acquire the at least one function in the accessed file, and separately calculate a function hash value of each function in the at least one function using a preset hash algorithm.

The gateway device entity further includes a transmitter 33 and a receiver 34, where the transmitter 33 is configured to send the at least one function hash value to a file reputation server such that the file reputation server determines, using the classifier obtained in advance by training, the probability distribution separately corresponding to each function hash value in the at least one function hash value, and the receiver 34 is configured to receive the probability distribution corresponding to each function hash value and returned by the file reputation server.

The processor 32 is further configured to determine whether a function hash value, whose probability distribution indicates that a probability that the function hash value appears in the file of the black sample set is higher than a first preset threshold, exists in the accessed file, determine whether a quantity of function hash values, whose probability distributions indicate that probabilities that the function hash values appear in the file of the black sample set are higher than the first preset threshold, exceeds a preset quantity, and determine that the accessed file has a reputation value lower than a second preset threshold if function hash values, whose quantity exceeds the preset quantity and whose probability distributions indicate that probabilities that the function hash values appear in the file of the black sample set are higher than the first preset threshold exist.

The gateway device provided in this apparatus embodiment is applied to scenarios described in method Embodiment 1 and method Embodiment 2, to implement functions of the gateway device in method Embodiment 1 and method Embodiment 2. For another additional function that can be implemented by the gateway device and a process of interacting with another network element device, reference may be made to descriptions of the gateway device in method Embodiment 1 and method Embodiment 2, and details are not described herein again.

Figure 6:
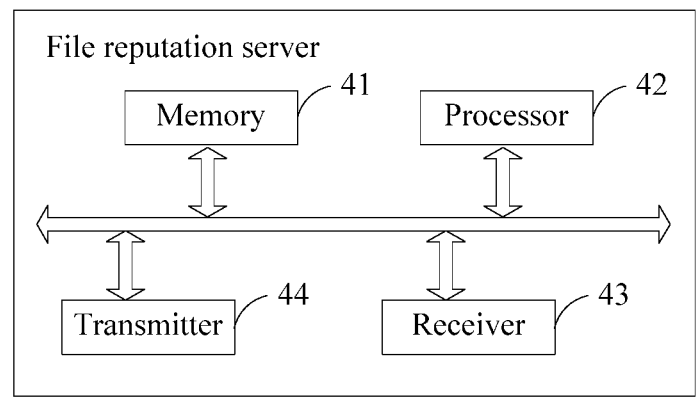
FIG. 6 is a schematic structural diagram of a file reputation server according to Embodiment 6 of the present disclosure.

FIG. 6 is a schematic structural diagram of a file reputation server entity according to Embodiment 6 of the present disclosure. As shown in FIG. 6, the file reputation server entity includes a memory 41 and a processor 42 connected to the memory 41, where the memory 41 is configured to store a set of program code, and the processor 42 is configured to invoke the program code stored in the memory 41 to perform steps in the file reputation acquiring method shown in FIG. 2, which includes separately acquiring at least one function in a file of a black sample set and at least one function in a file of a white sample set, where the black sample set includes at least one malicious program file, and the white sample set includes at least one normal program file, separately calculating a function hash value of each function in the at least one function in the file of the black sample set and the at least one function in the file of the white sample set, training a classifier using the function hash value of each function as an input, and counting, at an output end of the classifier, a quantity of times that the function hash value of each function appears in the file of the black sample set and a quantity of times that the function hash value of each function appears in the file of the white sample set, and for the function hash value of each function, performing normalization processing on the quantity of times that the function hash value appears in the file of the black sample set and the quantity of times that the function hash value appears in the file of the white sample set, to obtain a probability distribution of the function hash value of each function in order to form a function hash value probability distribution set.

The file reputation server entity further includes a receiver 43 and a transmitter 44, where the receiver 43 is configured to receive at least one function hash value sent by a gateway device, where the at least one function hash value is acquired by the gateway device according to an accessed file, and the accessed file is an executable program file, correspondingly, the processor 42 is further configured to determine, using the classifier obtained by training, a probability distribution separately corresponding to each function hash value in the at least one function hash value in the accessed file, and the transmitter 44 is configured to send, to the gateway device, the probability distribution corresponding to each function hash value in the at least one function hash value in the accessed file.

The processor 42 is further configured to query the function hash value probability distribution set for the probability distribution separately corresponding to each function hash value in the at least one function hash value in the accessed file.

The file reputation server provided in this apparatus embodiment is applied to a scenario described in Embodiment 2, to implement functions of the file reputation server in Embodiment 2. For another additional function that can be implemented by the file reputation server and a process of interacting with another network element device, reference may be made to descriptions of the file reputation server in method Embodiment 2, and details are not described herein again.

Persons of ordinary skill in the art may understand that all or some of the steps of the method embodiments may be implemented by a program instructing relevant hardware. The program may be stored in a computer readable storage medium. The steps of the method embodiments are performed when the program runs. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features of the technical solutions, without departing from the scope of the technical solutions of the embodiments of the present disclosure.

What is claimed is:

1. A file reputation acquiring method, comprising:
    acquiring at least one function in an accessed file by:
        acquiring information, which is part of a header of the accessed file, about a function start position; and
        disassembling, from the function start position, the accessed file using a ret instruction as a function end instruction, to acquire the at least one function in the accessed file;
    acquiring a function hash value of each function in the at least one function to obtain at least one function hash value by separately calculating the function hash value of each function in the at least one function using a preset hash algorithm, wherein the accessed file is an executable program file, and wherein each function is a segment of instruction data;
    determining, using a classifier obtained in advance by training, a probability distribution separately corresponding to each function hash value in the at least one function hash value, wherein the probability distribution is used to indicate a probability that each function hash value appears in a file of a black sample set, and a probability that each function hash value appears in a file of a white sample set, wherein the black sample set comprises at least one malicious program file, and wherein the white sample set comprises at least one normal program file; and
    determining a reputation value of the accessed file according to the probability distribution corresponding to each function hash value.

2. The method according to claim 1, wherein determining, the probability distribution separately corresponding to each function hash value in the at least one function hash value comprises sending the at least one function hash value to a file reputation server such that the file reputation server determines, using the classifier obtained in advance by training, the probability distribution separately corresponding to each function hash value in the at least one function hash value, and
    wherein before determining the reputation value of the accessed file, the method further comprises receiving the probability distribution corresponding to each function hash value and returned by the file reputation server.

3. The method according to claim 1, wherein determining the reputation value of the accessed file comprises:
    determining whether a function hash value of a first type, wherein a probability distribution of the function hash value of the first type indicates that a probability that the function hash value of the first type appears in the file of the black sample set is higher than a first preset threshold, exists in the accessed file;
    determining whether a quantity of function hash values of the first type exceeds a preset quantity; and
    determining that the accessed file has the reputation value lower than a second preset threshold when the quantity of function hash values of the first type exceeds the preset quantity.

4. The method according to claim 1, wherein determining, the probability distribution separately corresponding to each function hash value in the at least one function hash value comprises sending the at least one function hash value to a file reputation server such that the file reputation server determines, using the classifier obtained in advance by training, the probability distribution separately corresponding to each function hash value in the at least one function hash value, and wherein before determining the reputation value of the accessed file, the method further comprises receiving the probability distribution corresponding to each function hash value and returned by the file reputation server.

5. The method according to claim 1, wherein determining the reputation value of the accessed file comprises:
    determining whether a function hash value of a first type, wherein a probability distribution of the function hash value of the first type indicates that a probability that the function hash value of the first type appears in the file of the black sample set is higher than a first preset threshold, exists in the accessed file;
    determining whether a quantity of function hash values of the first type exceeds a preset quantity; and
    determining that the accessed file has the reputation value lower than a second preset threshold when the quantity of function hash values of the first type exceeds the preset quantity.

6. A file reputation acquiring method, comprising:
    separately acquiring at least one function in a file of a black sample set and at least one function in a file of a white sample set, wherein the black sample set comprises at least one malicious program file, wherein the white sample set comprises at least one normal program file, and wherein the at least one function is acquired by:
        acquiring information, which is part of a header of the file of the corresponding black sample set or the corresponding white sample set, about a function start position; and
        disassembling, from the function start position, the file of the corresponding black sample set or the corresponding white sample set using a ret instruction as a function end instruction, to acquire the at least one function in the file, wherein each function is a segment of instruction data;
    separately calculating a function hash value of each function in the at least one function in the file of the black sample set and the at least one function in the file of the white sample set;
    training a classifier using the function hash value of each function as an input;
    counting, at an output end of the classifier, a quantity of times that the function hash value of each function appears in the file of the black sample set and a quantity of times that the function hash value of each function appears in the file of the white sample set; and
    performing normalization processing on the quantity of times that the function hash value appears in the file of the black sample set and the quantity of times that the function hash value appears in the file of the white sample set for the function hash value of each function, to obtain a probability distribution of the function hash value of each function in order to form a function hash value probability distribution set.

7. The method according to claim 6, wherein after obtaining the probability distribution of the function hash value of each function, the method further comprises:
receiving at least one function hash value sent by a gateway device, wherein the at least one function hash value is acquired by the gateway device according to an accessed file, and wherein the accessed file is an executable program file;
determining, using the classifier, a probability distribution separately corresponding to each function hash value in the at least one function hash value in the accessed file; and
sending, to the gateway device, the probability distribution corresponding to each function hash value in the at least one function hash value in the accessed file.

8. The method according to claim 7, wherein determining, the probability distribution separately corresponding to each function hash value in the at least one function hash value in the accessed file comprises querying the function hash value probability distribution set for the probability distribution separately corresponding to each function hash value in the at least one function hash value in the accessed file.

9. A gateway device, comprising:
a processor; and
a memory coupled to the processor and configured to store a plurality of instructions that when executed by the processor cause the processor to:
acquire at least one function in an accessed file by:
acquiring information, which is part of a header of the accessed file, about a function start position; and
disassembling, from the function start position, the accessed file using a ret instruction as a function end instruction, to acquire the at least one function in the accessed file;
acquire a function hash value of each function in the at least one function to obtain at least one function hash value by separately calculating the function hash value of each function in the at least one function using a preset hash algorithm, wherein the accessed file is an executable program file, wherein each function is a segment of instruction data;
determine, using a classifier obtained in advance by training, a probability distribution separately corresponding to each function hash value in the at least one function hash value, wherein the probability distribution is used to indicate a probability that each function hash value appears in a file of a black sample set, and a probability that each function hash value appears in a file of a white sample set, wherein the black sample set comprises at least one malicious program file, and wherein the white sample set comprises at least one normal program file; and
determine a reputation value of the accessed file according to the probability distribution that is corresponding to each function hash value.

10. The device according to claim 9, wherein the instructions when executed by the processor further cause the processor to:
send the at least one function hash value to a file reputation server such that the file reputation server determines, using the classifier obtained in advance by training, the probability distribution separately corresponding to each function hash value in the at least one function hash value; and
receive the probability distribution corresponding to each function hash value and returned by the file reputation server.

11. The device according to claim 9, wherein the instructions when executed by the processor further cause the processor to:
determine whether a function hash value of a first type, wherein a probability distribution of the function hash value of the first type indicates that a probability that the function hash value of the first type appears in the file of the black sample set is higher than a first preset threshold, exists in the accessed file;
determine whether a quantity of function hash values of the first type exceeds a preset quantity; and
determine that the accessed file has the reputation value lower than a second preset threshold when the quantity of function hash values of the first type exceeds the preset quantity.

12. The device according to claim 9, wherein the instructions when executed by the processor further cause the processor to:
send the at least one function hash value to a file reputation server such that the file reputation server determines, using the classifier obtained in advance by training, the probability distribution separately corresponding to each function hash value in the at least one function hash value; and
receive the probability distribution corresponding to each function hash value and returned by the file reputation server.

13. The device according to claim 9, wherein the instructions when executed by the processor further cause the processor to:
determine whether a function hash value of a first type, wherein a probability distribution of the function hash value of the first type indicates that a probability that the function hash value of the first type appears in the file of the black sample set is higher than a first preset threshold, exists in the accessed file;
determine whether a quantity of function hash values of the first type exceeds a preset quantity; and
determine that the accessed file has the reputation value lower than a second preset threshold when the quantity of function hash values of the first type exceeds the preset quantity.

14. A file reputation server, comprising:
a processor; and
a memory coupled to the processor and configured to store a plurality of instructions that when executed by the processor cause the processor to:
separately acquire at least one function in a file of a black sample set and at least one function in a file of a white sample set, wherein each function is a segment of instruction data, wherein the black sample set comprises at least one malicious program file, wherein the white sample set comprises at least one normal program, and wherein the at least one function is acquired by:
acquiring information, which is part of a header of the file of the corresponding black sample set or the corresponding white sample set, about a function start; and
disassembling, from the function start position, the file of the corresponding black sample set or the corresponding white sample set using a ret instruction as a function end instruction, to acquire the at least one function in the file, wherein each function is a segment of instruction data;
separately calculate a function hash value of each function in the at least one function in the file of the black sample set and the at least one function in the file of the white sample set;
train a classifier using the function hash value, of each function as an input;
count, at an output end of the classifier, a quantity of times that the function hash value of each function appears in the file of the black sample set and a quantity of times that the function hash value of each function appears in the file of the white sample set; and
perform normalization processing on the quantity of times that the function hash value appears in the file of the black sample set and the quantity of times that the function hash value appears in the file of the white sample set for the function hash value of each function, to obtain a probability distribution of the function hash value of each function in order to form a function hash value probability distribution set.

15. The server according to claim 14, wherein the instructions when executed by the processor further cause the processor to:
receive at least one function hash value sent by a gateway device, wherein the at least one function hash value is acquired by the gateway device according to an accessed file, and the accessed file is an executable program file;
determine, using the classifier obtained by training, a probability distribution separately corresponding to each function hash value in the at least one function hash value in the accessed file; and
send, to the gateway device, the probability distribution corresponding to each function hash value in the at least one function hash value in the accessed file.

16. The server according to claim 15, wherein the instructions when executed by the processor further cause the processor to query the function hash value probability distribution set for the probability distribution separately corresponding to each function hash value in the at least one function hash value in the accessed file.

* * * * *

UNITED STATES PATENT AND TRADEMARK OFFICE
CERTIFICATE OF CORRECTION

| | |
|---|---|
| PATENT NO. | : 10,355,866 B2 |
| APPLICATION NO. | : 15/264719 |
| DATED | : July 16, 2019 |
| INVENTOR(S) | : Zhenhua Liu |

Page 1 of 1

It is certified that error appears in the above-identified patent and that said Letters Patent is hereby corrected as shown below:

In the Claims

Claim 14, Column 18, Line 66 should read:
"tion start position: and"

Signed and Sealed this
Twenty-seventh Day of August, 2019

Andrei Iancu
*Director of the United States Patent and Trademark Office*